United States Patent
Miner et al.

(10) Patent No.: US 9,426,521 B2
(45) Date of Patent: Aug. 23, 2016

(54) SYSTEM AND METHOD TO DETECT GARBLED CLOSED CAPTIONING

(71) Applicant: The DIRECTV Group, Inc., El Segundo, CA (US)

(72) Inventors: Daniel M. Miner, Redondo Beach, CA (US); Kevin S. Culwell, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 14/849,499

(22) Filed: Sep. 9, 2015

(65) Prior Publication Data

US 2016/0007081 A1    Jan. 7, 2016

Related U.S. Application Data

(63) Continuation of application No. 14/561,088, filed on Dec. 4, 2014, now Pat. No. 9,154,816, which is a continuation of application No. 14/188,558, filed on Feb. 24, 2014, now Pat. No. 8,913,187.

(51) Int. Cl.
*H04N 7/00*    (2011.01)
*H04N 11/00*    (2006.01)
(Continued)

(52) U.S. Cl.
CPC ...... *H04N 21/44008* (2013.01); *H04N 17/004* (2013.01); *H04N 21/235* (2013.01); *H04N 21/23418* (2013.01); *H04N 21/23614* (2013.01); *H04N 21/435* (2013.01); *H04N 21/4884* (2013.01)

(58) Field of Classification Search
CPC ........... H04N 21/435; H04N 21/4345; H04N 21/4884; H04N 21/44008; H04N 21/44; H04N 21/482; H04N 21/8133; H04N 5/278; H04N 7/00; H04N 11/00; H04N 21/488
USPC ....... 348/465, 467, 468, 461, 473, 476, 564, 348/552, 469, 569, 589, 600, 180, 184; 725/53, 135, 112, 137, 139, 152; 704/270, 251
IPC ............................................ H04N 7/00, 11/00
See application file for complete search history.

(56) References Cited

U.S. PATENT DOCUMENTS

| | | | | |
|---|---|---|---|---|
| 8,045,054 B2 * | 10/2011 | Bishop | ................. | G06F 17/289 348/468 |
| 8,149,330 B2 * | 4/2012 | Streijl | ................. | H04N 7/0885 348/468 |

(Continued)

*Primary Examiner* — Trang U Tran
(74) *Attorney, Agent, or Firm* — Fitzgerald & Isaacson, LLP (57) ABSTRACT

A garbled closed captioning detector analyzes closed captioning data at predetermined intervals to determine whether a metric derived from the closed-captioning data exceeds a threshold. If the metric exceeds the predetermined threshold, the closed captioning data is presumed to be garbled. For example, the metric may be the percentage of words in the closed captioning data having a desired word length observed in a particular interval compared to all words in the closed captioning data observed in the interval. If the percentage of words having a desired word length exceeds a predetermined threshold, the closed captioning data is presumed to be garbled.

18 Claims, 10 Drawing Sheets

(51) Int. Cl.
*H04N 21/44* (2011.01)
*H04N 21/488* (2011.01)
*H04N 17/00* (2006.01)
*H04N 21/234* (2011.01)
*H04N 21/235* (2011.01)
*H04N 21/236* (2011.01)
*H04N 21/435* (2011.01)

(56) References Cited

U.S. PATENT DOCUMENTS 8,345,159 B2 * 1/2013 Polumbus ............ H04N 7/0882
 348/468
2014/0009677 A1 * 1/2014 Homyack .............. H04N 5/445
 348/468

* cited by examiner

SYSTEM AND METHOD TO DETECT GARBLED CLOSED CAPTIONING

BACKGROUND

1. Field

Embodiments relate to closed captioning systems. More particularly, embodiments relate to detecting a garbled closed captioning and providing an alert when garbled closed captioning is detected.

2. Background

Closed captioning is an important component for modern television delivery. By allowing people to "see" what is being said in a closed captioning box on a video display, closed captioning brings a fuller television experience to people with hearing problems and others. For example, closed captioning can be used as a tool by people learning to read, or trying to learn a new language, or in an environment where standard television audio would be difficult to hear or is intentionally muted.

Of course, such systems have limited utility if the closed captioning data is garbled, which would lead to gibberish being displayed in the closed captioning box. Closed captioning garbling can arise when a system converts frame rates from a lower frame rate to a higher frame rate, for example, from 24 frames per second to 60 frames per second. In such cases, the closed captioning data may be repeated. A second source of closed captioning garbling results from errors due to noise or other transmission problems.

Whatever the cause, currently detecting garbled closed captioning is not readily accomplished without visual feedback of the closed captioning data. While garbled closed captioning may lead to complaints from a service provider's customers, most service provider's customers do not use closed captioning. Instead, any complaints are more likely to be in the form of formal complaints from the Federal Communications Commission, which could lead to fines. Avoiding such complaints and fines is obviously beneficial.

SUMMARY

What is required, therefore, is a system to detect garbled closed captioning and to provide an alert in the event garbled closed captioning is detected.

In an embodiment, a garbled closed captioning detector analyzes closed captioning data at predetermined intervals to determine whether a metric derived from the closed-captioning data exceeds a threshold. If the metric exceeds the predetermined threshold, the closed captioning data is presumed to be garbled. For example, the metric may be the percentage of words in the closed captioning data having a desired word length observed in a particular interval compared to all words in the closed captioning data observed in the interval. If the percentage of words having a desired word length exceeds a predetermined threshold, the closed captioning data is presumed to be garbled.

In an embodiment, garbled closed captioning detection is performed by a system that includes a closed captioning data detector to detect closed captioning data in a video data stream, a word extractor/counter to extract individual words from the closed captioning data, to store a count of the total number of words in the closed captioning data in a memory, and to store a count of the total number of words having a desired word length or range of word lengths in the closed captioning data in the memory, a percentage threshold detector to determine a percentage of words having the desired length or range of lengths in the closed captioning data as a ratio of the count of the number of words in the closed captioning data having the desired length or range of lengths to the count of the total number of words in the closed captioning data, and an alert that is provided when the determined percentage exceeds a predetermined threshold.

In another embodiment, garbled closed captioning detection is performed by a method that includes detecting closed captioning data in a video data stream identifying and extracting individual words from the closed captioning data, determining a word boundary in the closed captioning data using a delimiter, storing a count of the total number of words in the closed captioning data in a memory based on the determined word boundary, storing a count of the total number of words having a desired word length or range of word lengths in the closed captioning data in the memory based on the determined word boundary, determining a percentage of words having the desired length or range of lengths in the closed captioning data as a ratio of the count of the number of words in the closed captioning data having the desired length or range of lengths to the count of the total number of words in the closed captioning data, and providing an alert when the determined percentage exceeds a predetermined threshold.

Additional features and embodiments of the present invention will be evident in view of the following detailed description of the invention.

DETAILED DESCRIPTION

Figure 1:
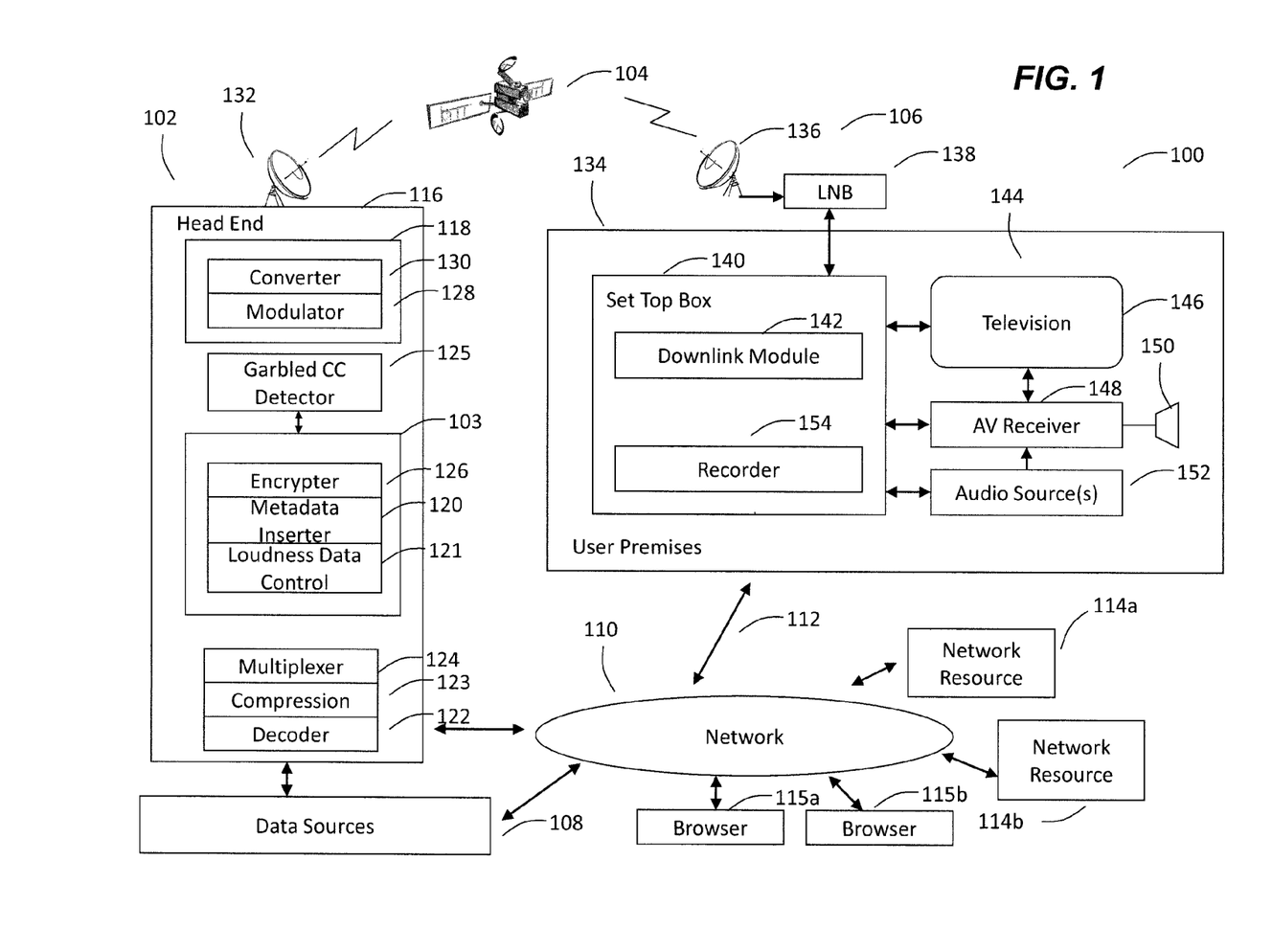
FIG. 1 is a schematic diagram of an exemplary system to detect garbled closed captioning in a television broadcast system according to an embodiment of the present invention.

FIG. 1 is a schematic diagram of an exemplary system 100 to detect garbled closed captioning in a television broadcast system, such as a television satellite service provider, according to an embodiment. As shown in FIG. 1, exemplary system 100 is an example direct-to-home (DTH) transmission and reception system. Example DTH system 100 generally includes a transmission station 102, a satellite/relay 104, and a plurality of receiver stations, one of which is shown at reference numeral 106, between which wireless communications are exchanged at any suitable frequency (e.g., Ku-band, Ka-band, and reverse band frequencies). As described in detail below with respect to each portion of system 100, information from one or more of a plurality of data sources 108 is transmitted from transmission station 102 to satellite/relay 104. Satellite/relay 104 may be at least one geosynchronous or geo-stationary satellite. In turn, satellite/relay 104 rebroadcasts the information received from transmission station 102 over broad geographical area(s), which include receiver station 106.

In an embodiment, example receiver station 106 is also communicatively coupled to transmission station 102 via a network 110. Network 110 can be, for example, the Internet, a local area network (LAN), a wide area network (WAN), a conventional public switched telephone network (PSTN), and/or any other suitable network system. A connection 112 (e.g., a terrestrial link via a telephone line) to network 110 may also be used for supplemental communications (e.g., software updates, subscription information, programming data, information associated with interactive programming, etc.) with transmission station 102 and/or may facilitate other general data transfers between receiver station 106 one or more network resources 114a and 114b, such as, for example, file servers, web servers, and/or databases (e.g., a library of on-demand programming).

Data sources 108 receive and/or generate video, audio, and/or audiovisual programming including, for example, television programming, movies, sporting events, news, music, pay-per-view programs, advertisement(s), game(s), etc. In the illustrated example, data sources 108 receive programming from, for example, television broadcasting networks, cable networks, advertisers, and/or other content distributors. Further, example data sources 108 may include a source of program guide data that is used to display an interactive program guide (e.g., a grid guide that informs users of particular programs available on particular channels at particular times and information associated therewith) to an audience. Users can manipulate the program guide (e.g., via a remote control) to, for example, select a highlighted program for viewing and/or to activate an interactive feature (e.g., a program information screen, a recording process, a future showing list, etc.) associated with an entry of the program guide. Further, example data sources 108 include a source of on-demand programming to facilitate an on-demand service.

An example head-end 116 includes a decoder 122 and compression system 123, a transport processing system (TPS) 103 and an uplink module 118. In an embodiment, decoder 122 decodes the information received from data sources 108 by for example, converting the information into data streams. In an embodiment, compression system 123 compresses the bit streams into a format for transmission. Exemplary formats include MPEG-2, MPEG-4, and HEVC. In some cases, AC-3 audio is not decoded, but passed directly through without first decoding. In such cases, only the video portion of the source data is decoded.

In an embodiment, multiplexer 124 multiplexes the data streams generated by compression system 123 into a transport stream so that, for example, different channels are multiplexed into one transport. Further, in some cases a header is attached to each data packet within the packetized data stream to facilitate identification of the contents of the data packet. In other cases, the data may be received already transport packetized.

TPS 103 receives the multiplexed data from multiplexer 124 and prepares the same for submission to uplink module 118. TPS 103 includes a loudness data control module 121 to perform loudness control (e.g., audio automatic gain control (AGC)) on audio data received from data source 108 as described in more detail below. Generally, example metadata inserter 120 associates the content with certain information such as, for example, identifying information related to media content and/or instructions and/or parameters specifically dedicated to an operation of one or more audio loudness operations. As described below, for example, in an embodiment, metadata inserter 120 replaces scale factor data in the MPEG-1, layer II audio data header and dialnorm in the AC-3 audio data header in accordance with adjustments made by loudness data control module 121.

In an embodiment, system 100 includes a garbled closed caption detector 125. As described in greater detail below, garbled closed caption detector 125 analyzes closed captioning data to determine a metric that is compared to a predetermined threshold. If the metric exceeds the predetermined threshold, a garbled closed captioning detector 125 causes an alert to be provided. In an embodiment, the metric is the percentage of words having a certain number or certain range of characters, that is a certain word length or range of word lengths.

In an embodiment, garbled closed captioning detector 125 can execute in TPS 103 or can execute on a stand alone computer separate from TPS 103. In an embodiment, garbled closed captioning detector is implemented in hardware, firmware, software, or some combination of hardware, firmware, and software.

In the illustrated example, the data packet(s) are encrypted by an encrypter 126 using any suitable technique capable of protecting the data packet(s) from unauthorized entities.

Uplink module 118 prepares the data for transmission to satellite/relay 104. In an embodiment, uplink module 118 includes a modulator 128 and a converter 130. During operation, encrypted data packet(s) are conveyed to modulator 128, which modulates a carrier wave with the encoded information. The modulated carrier wave is conveyed to converter 130, which, in the illustrated example, is an uplink frequency converter that converts the modulated, encoded bit stream to a frequency band suitable for reception by satellite/relay 104. The modulated, encoded bit stream is then routed from uplink frequency converter 130 to an uplink antenna 132 where it is conveyed to satellite/relay 104.

Satellite/relay 104 receives the modulated, encoded bit stream from the transmission station 102 and broadcasts it downward toward an area on earth including receiver station 106. Example receiver station 106 is located at a subscriber premises 134 having a reception antenna 136 installed thereon that is coupled to a low-noise-block downconverter (LNB) 138. LNB 138 amplifies and, in some examples, downconverts the received bitstream. In the illustrated example of FIG. 1, LNB 138 is coupled to a set-top box 140. While the example of FIG. 1 includes a set-top box, the example methods, apparatus, systems, and/or articles of manufacture described herein can be implemented on and/or in conjunction with other devices such as, for example, a personal computer having a receiver card installed therein to enable the personal computer to receive the media signals described herein, and/or any other suitable device. Additionally, the set-top box functionality can be built into an A/V receiver or a television 146.

Example set-top box 140 receives the signals originating at head-end 116 and includes a downlink module 142 to process the bitstream included in the received signals. Example downlink module 142 demodulates, decrypts, demultiplexes, decodes, and/or otherwise processes the bitstream such that the content (e.g., audiovisual content) represented by the bitstream can be presented on a display device of, for example, a media presentation system 144. Example media presentation system 144 includes a television 146, an AV receiver 148 coupled to a sound system 150, and one or more audio sources 152. As shown in FIG. 1, set-top box 140 may route signals directly to television 146 and/or via AV receiver 148. In an embodiment, AV receiver 148 is capable of controlling sound system 150, which can be used in conjunction with, or in lieu of, the audio components of television 146. In an embodiment, set-top box 140 is responsive to user inputs to, for example, to tune a particular channel of the received data stream, thereby displaying the particular channel on television 146 and/or playing an audio stream of the particular channel (e.g., a channel dedicated to a particular genre of music) using the sound system 150 and/or the audio components of television 146. In an embodiment, audio source(s) 152 include additional or alternative sources of audio information such as, for example, an MP3 player (e.g., an Apple® iPod®), a Blu-eray® player, a Digital Versatile Disc (DVD) player, a compact disc (CD) player, a personal computer, etc.

Further, in an embodiment, example set-top box 140 includes a recorder 154. In an embodiment, recorder 154 is capable of recording information on a storage device such as, for example, analog media (e.g., video tape), computer readable digital media (e.g., a hard disk drive, a digital versatile disc (DVD), a compact disc (CD), flash memory, etc.), and/or any other suitable storage device.

One or more computers having a browser execution thereon can access data from TPS 103 collected and stored by garbled closed captioning detector 125. The browsers are remote applications that execute on remote computers 115a and 115b. Exemplary such browsers include Microsoft Internet Explorer® and Mozilla FireFox®. For example, in an embodiment, computers 115a and 115b access data stored by the TPS for viewing via the garbled closed captioning detector 125 using commands according to the TELNET or other messaging protocol over network 110. In this manner garbled closed captioning detection can be performed remotely by personnel not co-located with TPS 103.

Figure 2:
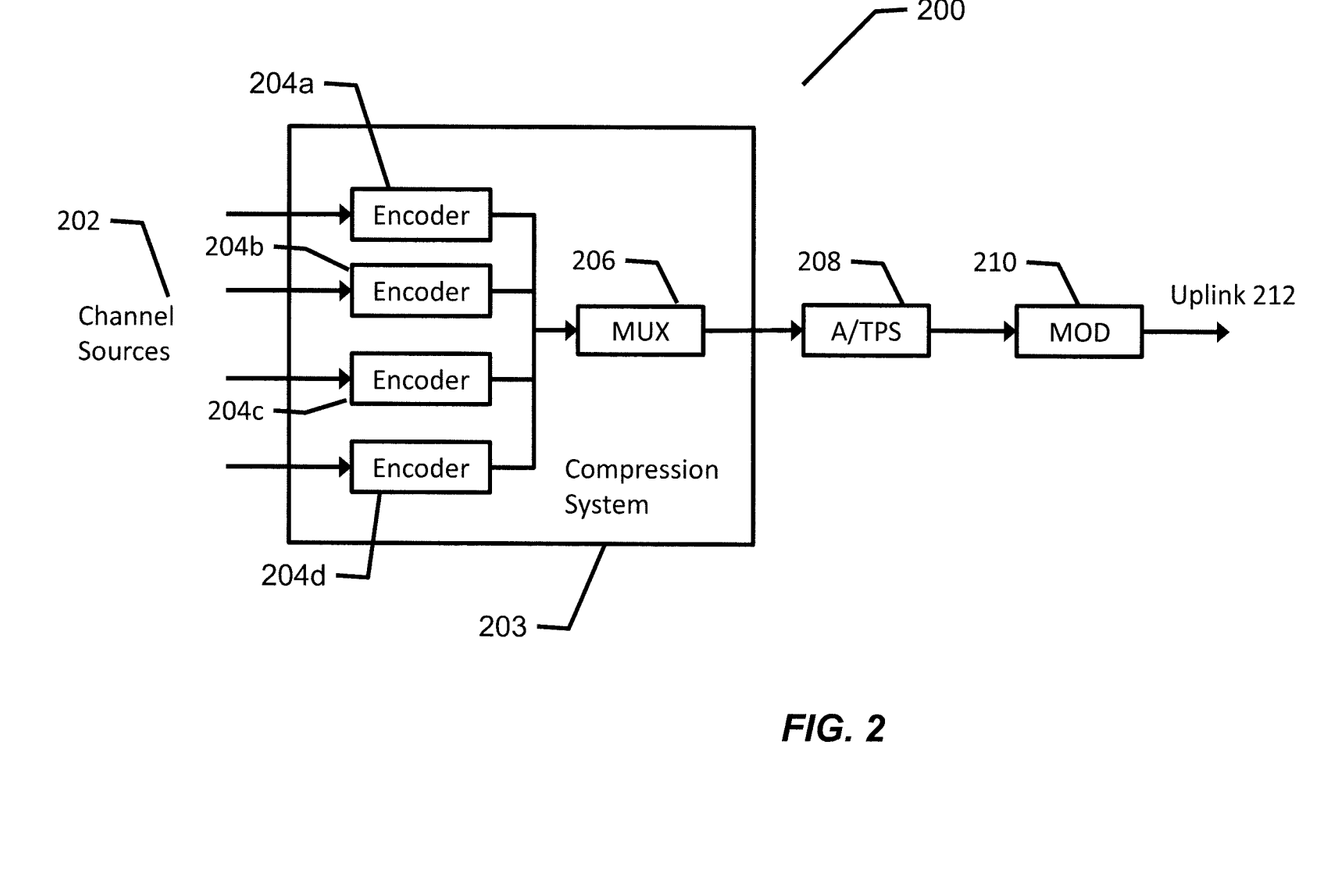
FIG. 2 illustrates more details of a system for detecting garbled closed captioning according to an embodiment of the present invention.

FIG. 2 illustrates more details of a system 200 for detecting garbled closed captioning according to an embodiment of the present invention. Channel sources 202 supply channel data to a compression system 203. In an embodiment, channel sources 202 are one or more of the data source in FIG. 1. Data provided by channel source 202 may require decoding prior to encoding by encoders 204a-d. In an embodiment, the channel sources embed close captioning data in the data they provide to compression system 203.

Compression system 203 includes one or more encoders 204a, 204b, 204c, and 204d. In an embodiment, encoders 204a-d compress the incoming data using a video compression format such as MPEG-2, MPEG-4, HEVC (H.265), or any other video compression format. Any embedded close captioning data is encoded into the video stream. The embedded closed caption data is indicated in the formatted data. For example, the embedded closed caption data is indicated by user data in MPEG-2 formatted data and by SEI messaging in MPEG-4 or HEVC formatted data. Because MPEG-2, MPEG-4, and HEVC video compression looks to future and past frames to process bi-directional frames (B-frames), encoders 204a-d often forward frames in a different order than the display order in which they were processed.

A multiplexer 206 combines the separate data streams output by encoders 204a-d into a single stream that is input to a transport processing system (TPS) 208. TPS 208 can be any system for processing video to be distributed to a service provider's subscribers. In an embodiment, TPS 208 can include a number of video processing functions, including loudness control, metadata insertion, and encryption, among others. As described in more detail below, TPS 208 determines whether the embedded closed captioning is garbled. In an embodiment, TPS 208 is comparable to TPS 103 described above with respect to FIG. 1.

TPS 208 forwards the video stream to a modulator 210. Modulator 210 modulates the video data stream to an RF frequency for distribution to a service provider's subscribers. Compression system 203, multiplexer 206, A/TPS 208, modulator 210 and uplink 212 can be part of head end 102 described above with respect to FIG. 1.

Figure 3:
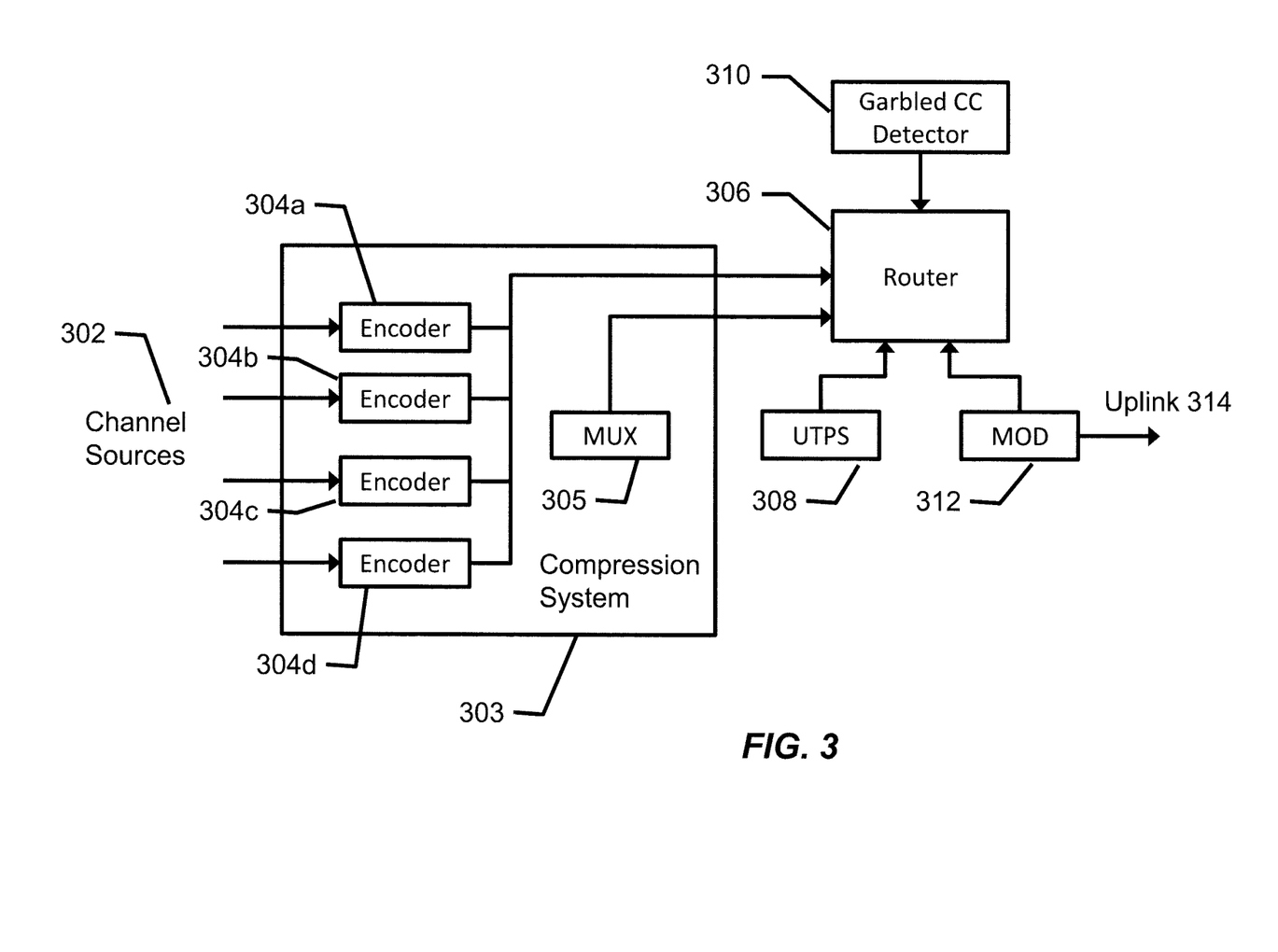
FIG. 3 illustrates more details of a system for detecting garbled closed captioning according to another embodiment of the present invention.

FIG. 3 illustrates more details of a system 300 for detecting garbled closed captioning according to another embodiment of the present invention. As described in more detail, the embodiment of FIG. 3 is a network embodiment. In an embodiment, various components send and receive data using multicasting.

Referring to FIG. 3, channel sources 302 supply channel data to a compression system 303. In an embodiment, channel sources 302 are one or more of the data source 108 in FIG. 1. Data provided by channel sources 302 may require decoding prior to encoding by encoders 304a-d. In an embodiment, the channel sources embed close captioning data in the date they provide to compression system 303.

Compression system 303 includes one or more encoders 304a, 304b, 304c, and 304d. In an embodiment, encoders 304a-d compress the incoming data using a video compression format such as MPEG-2, MPEG-4, HEVC (H.265), or any other video compression format. Any embedded close captioning date is encoded into the video stream. The embedded closed caption data is indicated in the formatted data. For example, the embedded closed caption data is indicated by user data (MPEG-2) or SEI data (MPEG-4 or HEVC). Because MPEG-2, MPEG-4, and HEVC video compression looks to future and past frames to process bi-directional frames (B-frames), encoders 304a-d often forward frames in a different order than the display order in which they were processed. Encoders 304a-d output the data to a router 306.

A multiplexer 305 obtains the date output by encoders 304a-d and combines the separate data streams output by encoders 304a-d into a single stream that is output to router 306. An uplink transport processing system (UTPS) 308 obtains the data output by multiplexer 305 from router 306, processes it and submits the processed data to router 306. UTPS 308 can be any system for processing video to be distributed to a service provider's subscribers. In an embodiment, UTPS 308 can include a number of video processing functions, including loudness control, metadata insertion, and encryption, among others. UTPS 308 forwards the video stream to router 306.

Modulator 312 obtains the video data stream processed by UTPS 308 from router 306, and modulates the video data stream to an RF frequency for distribution to a service provider's subscribers over uplink 314. Compression system 303, multiplexer 305, router 306, UTPS 308, garbled closed captioning detector 310, modulator 312 and uplink 314 can be part of head end 102 described above with respect to FIG. 1.

In an embodiment, multiplexer 305, UTPS 308, garbled closed captioning detector 310, and modulator 316 obtain the data they require for processing using multicast. Using multicast allows UTPS 308 to obtain data for processing to transmit to subscribers at the same time word extractor/counter 310 obtains the data for analysis for garbled closed captioning. That is, a level of parallel processing is achieved using multicast.

The network configuration of system 300 does not require the various components to be located locally with respect to one another. For example, in an embodiment, garbled closed captioning detector 310 is located at a remote third party service provider site. The network configuration of system 300 also allows garbled closed captioning detection to be offloaded from TPS 103 more seemlessly.

A garbled closed captioning detector 310 obtains the multiplexed data from router 306, and determines whether the embedded closed captioning is garbled. As mentioned, UTPS 308 determines whether closed captioning embedded in the video stream is garbled. If it finds the presence of garbled closed captioning data is causes an alert to be provided. Garbled closed captioning detector 310 can be implemented in hardware, firmware, software, or a combination of hardware, firmware, and software. Where the garbled closed captioning detector 310 is software it is coupled to router 306 logically via a network card on a computer on which it is operating.

Figure 4:
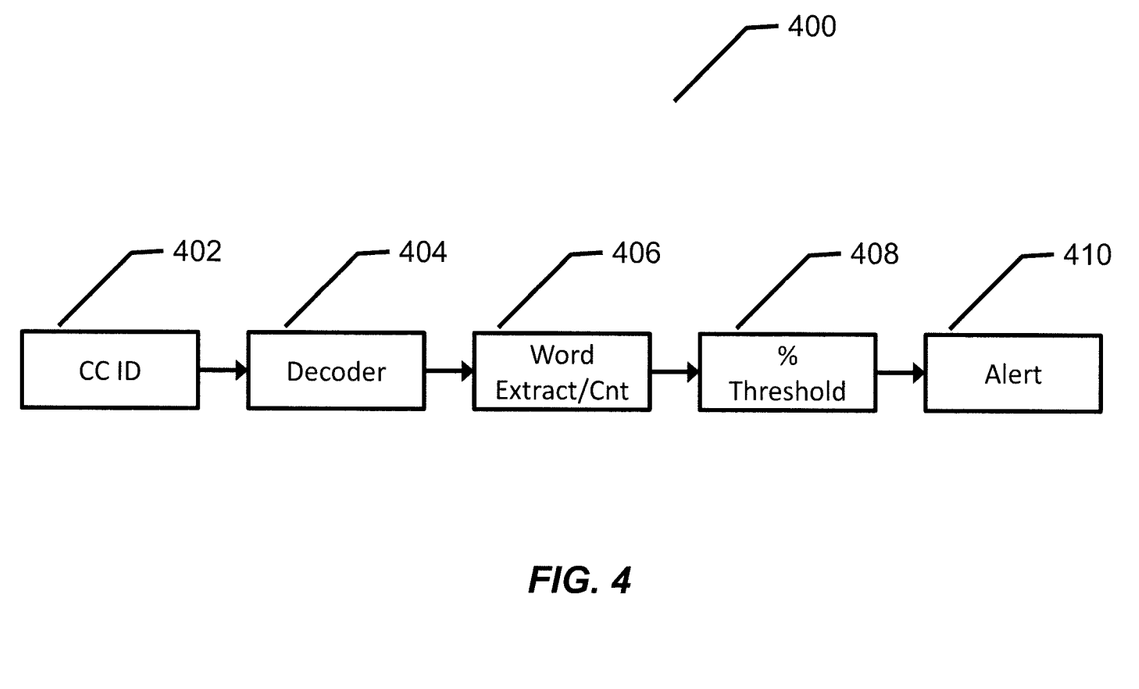
FIG. 4 illustrates exemplary components for detecting garbled closed captioning date and providing an alert of such detection.

FIG. 4 illustrates exemplary components 400 for detecting garbled closed captioning date and providing an alert of such detection. Components 400 may be incorporated into an A/TPS 208 described above with respect to FIG. 2 or into garbled closed captioning detector 310 described above with respect to FIG. 3. A closed caption data identification module 402 identifies the closed captioning data in the display order video stream. In an embodiment, the closed captioning data is identified using information encoded in the video stream data. For example, in MPEG-2 data, the closed captioning information is identified by user data. In MPEG-4 and HEVC, the closed captioning is identified by SEI messages. A decoder 404 reorders the identified closed captioning data being processed into display order, that is, the display order in which the video data stream was processed by encoders 204a-d or encoder 304a-d. Reordering may not be required in systems that use compression schemes that maintain display frame order during compression. Once reordered (if required), decoder 404 decodes the identified closed captioning data so that it can be processed. A word extractor/counter module 406 converts the closed captioning data to text and identifies words within the text. In an embodiment, word extractor/counter module 406 identifies words as all characters between two consecutive delimiters. In an embodiment, the delimiter used is a space (" ") character. Other delimiters may be used in an embodiment, in addition to, or in lieu of the space character. For example, in an embodiment, a comma (",") character and/or a period "." character may be used as delimiters in addition to the space character.

In an embodiment, word extractor/counter 406 determines and stores two values. The first value is a count of the total number of words in the closed captioning data. The second value is the number of words in the closed captioning data having a particular character count (that is, word length) or range of characters (that is, range of word lengths). For example, the second value might be the number words with 5 characters, the number of words having from 4 to 6 characters, or the number of words having more than 10 characters.

A percent threshold detector 408 then determines the percentage or ratio of words having the particular character count to the total number of words. This percentage is then compared to a predetermined percentage threshold to determine whether the closed captioning data is garbled. If the calculated percentage exceeds the predetermined percentage threshold, the closed captioning data is presumed to be garbled. An alert 410 is triggered when the data is determined to be garbled. Alert 410 can be any kind of alert or alarm, including without limitation textual, audible, visual (e.g., lights), or any combination of these.

As an exemplary embodiment to detect garbled closed captioning data, consider an embodiment in which the word length of interest is 10 or more characters and the predetermined percentage threshold is 5%. These values are used in the example because empirical testing has demonstrated that closed captioning data containing 5% or more words having 10 or more characters is garbled. In such an embodiment, the total number of words in the closed captioning data is stored (e.g., in a memory) as is the total number of words having 10 or more characters. The percentage of words having 10 or more characters when compared to the total number of words is determined. If the closed captioning stream contains 5% or more words having 10 or more characters, the closed captioning data is presumed to be garbled, alert 410 is triggered.

The determination of total word count and total count of words having a certain number of characters can be performed over any interval. For example, the interval may be 30 seconds, 30 minutes, 1 hour, or any other interval. In an embodiment, the interval does not have to be constant, but may change. For example, the interval may be shorter for different times of the day, different days of the week, and/or different times of year. At the end of each interval, a determination of whether the closed captioning is garbled is made using the percentage of words having the desired character count present during the interval, and alerting is performed when the calculated percentage exceeds the predetermined threshold percentage.

The predetermined percentage threshold can be made variable as well. For example, different predetermined percentage thresholds can be applied at different times of day, different days of week, and/or different times of year. In addition, the predetermined percentage threshold can be changed in response to data changes observed during any one or more intervals. Allowing the predetermined percentage threshold to be variable allows it to be optimized in response to observed data so as to reduce the number of false positives (providing an alert when, in fact, the closed captioning data is not garbled) and false negatives (not providing an alert when, in fact, the closed captioning data is garbled).

Figure 5:
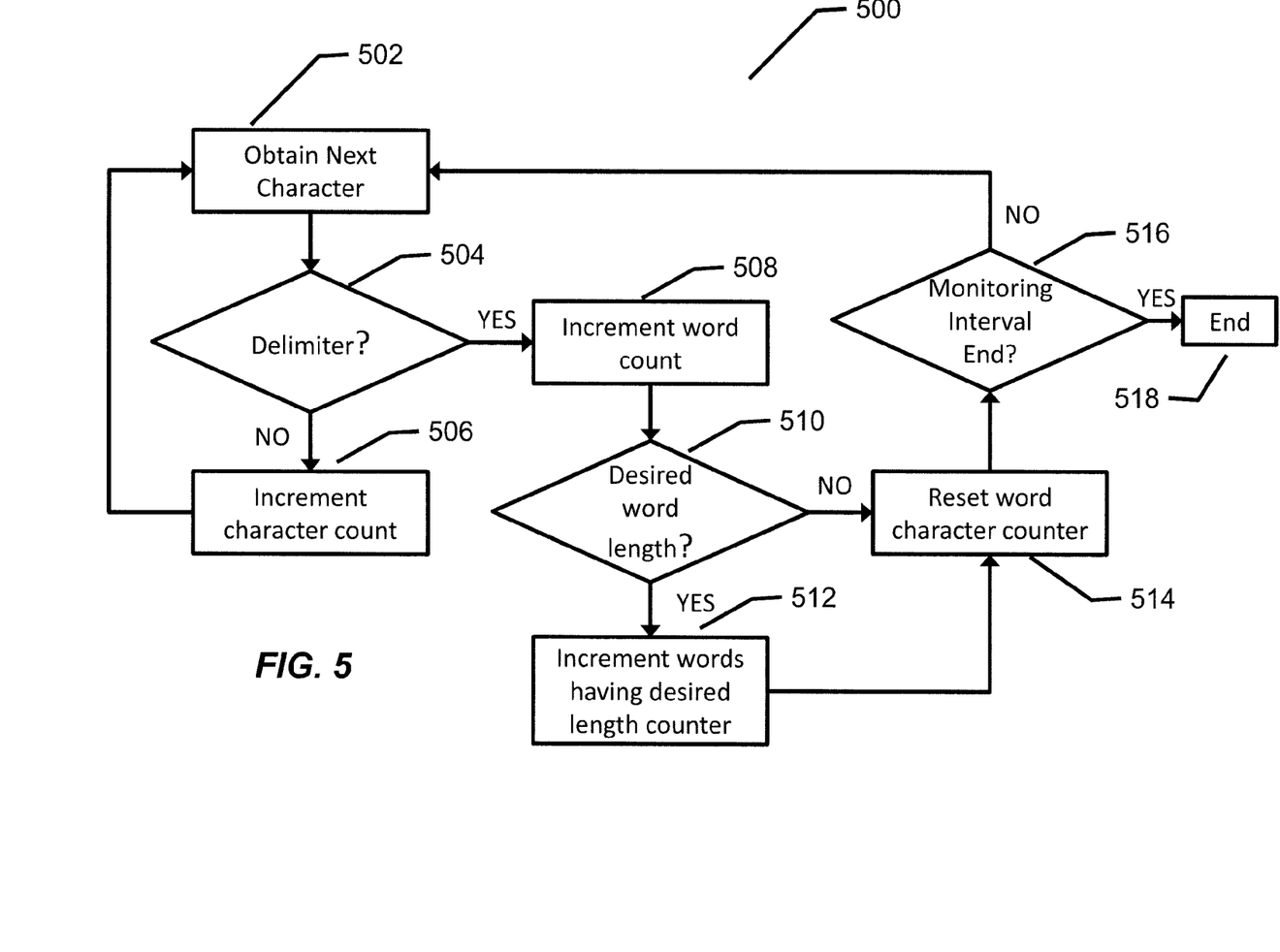
FIG. 5 illustrates a flow chart of a method to count words from the decoded closed captioning data according to an embodiment.

FIG. 5 illustrates a flow chart of a method 500 to count words from the decoded closed captioning data according to an embodiment. The method can be executed on any computer processor and use a memory in a well known manner. In step 502 the next character in the closed captioning stream is obtained. Step 504 determines whether the character is a delimiter. As described above, delimiters can be a space character, a comma character, a period character, and/or other delimiter characters. If the obtained character is not a delimiter, in step 506, a word character counter is incremented by one, and the method continues in step 502 by obtaining the next character in the closed captioning stream. If the obtained character is a delimiter, the method continues in step 508 by incrementing the total word counter by 1. The process can be made more robust by considering that two delimiters in sequence may not indicate a word. For example, a comma followed by a space does not indicate a word that should be counted. In step 510, the method determines whether the word total character count matches the character count of interest, that is, whether the calculated word length equals the desired length. If so, the method continues in step 512 by incrementing the total words having the desired character counter by 1, and resetting the word character counter to zero in step 514. If the word total character counter does not match the character count of interest, the method continues in step 514 by resetting the word character count to zero. The method then continues in step 516 by determining whether the end of a monitoring interval has been reached. If the end of a monitoring interval has not been reached, the method continues in step 502 by obtaining the next character in the closed captioning data. If the end of a monitoring interval has been reached, the method ends in step 518.

Figure 6:
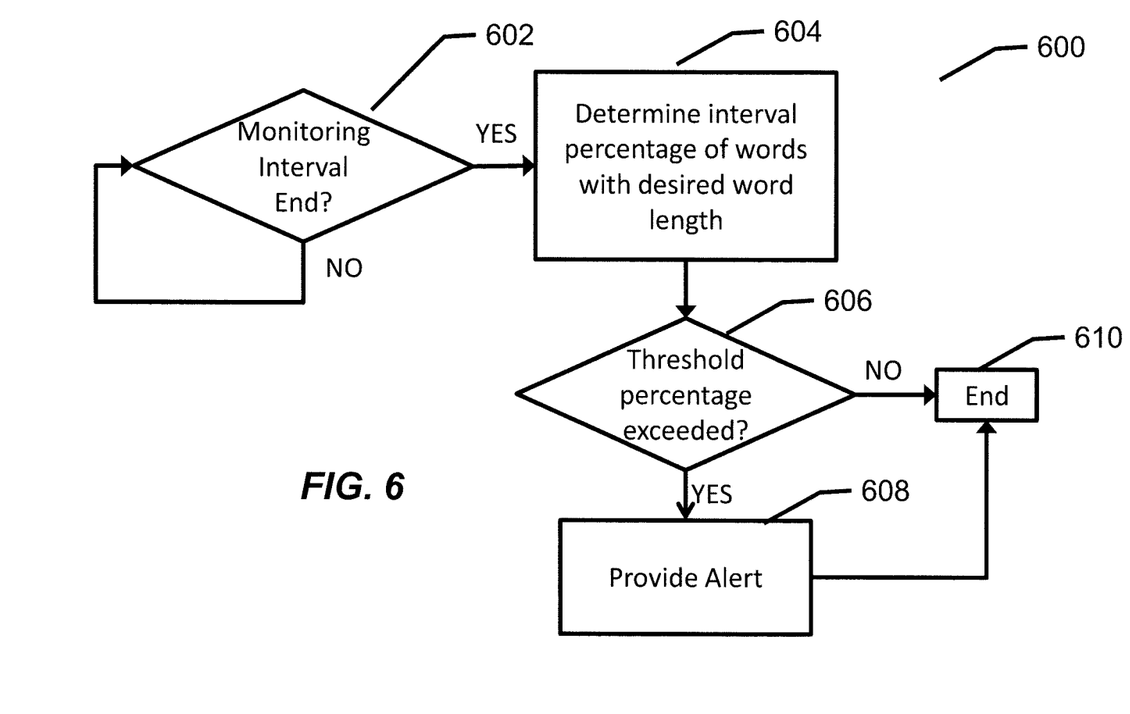
FIG. 6 illustrates a method 600 for determining whether to provide an alert according to an embodiment of the present invention.

FIG. 6 illustrates a method 600 for determining whether to provide an alert according to an embodiment of the present invention. In step 602, the method determines whether the end of a monitoring interval has been reached. If the end of a monitoring interval has not been reached the method continues in step 602 until the end of monitoring interval is reached. If the end of a monitoring interval has been reached, the method continues in step 604. In step 604, the interval percentage of words having the desired character count during the monitoring interval. The interval percentage is equal to the calculated percentage described above over a given monitoring interval. In an embodiment, this interval percentage is determined by dividing the value of the word total character counter by the value of the total word counter. Optionally, this value can be multiplied by 100 to obtain the percentage. In step 606, the percentage is compared to a predetermined threshold percentage. If the interval percentage exceeds the predetermined threshold percentage, an alert is provided in step 606 and the method ends in step 608. If the interval percentage does not exceed the predetermined threshold percentage, the method ends in step 610. In an embodiment, processing then continues for the next interval by obtaining the next character in the closed captioning stream for processing in step 602.

Figure 7:
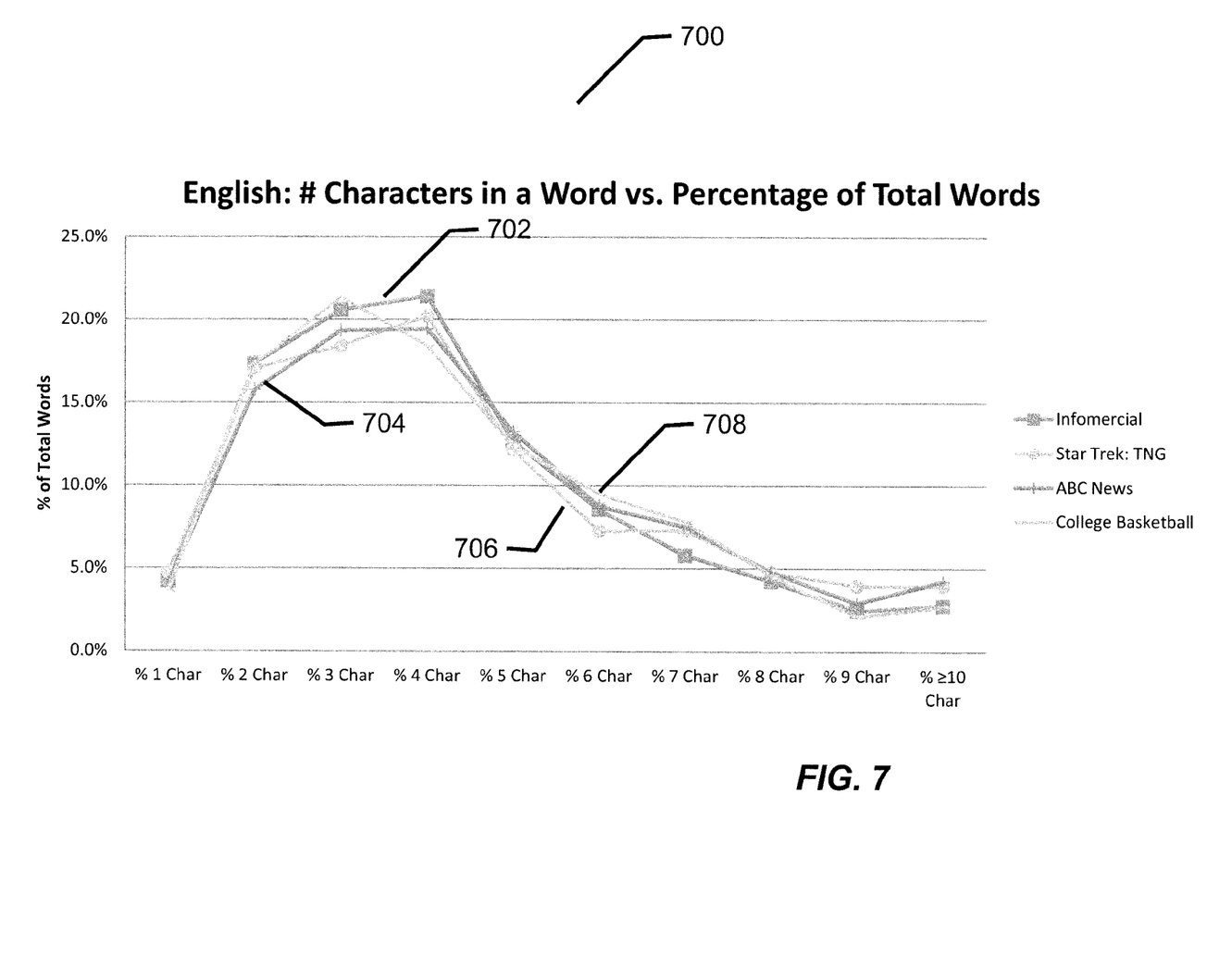
FIG. 7 is a graph illustrating the percentage words having a given number of characters (word length) for a variety of different closed captioning content streams.

In an embodiment, the predetermined percentage threshold can be determined using empirical methods. For example, FIG. 7 is a graph 700 illustrating the percentage words having a given number of characters (word length) for a variety of different closed captioning content streams including an infomercial (curve 702), an ABC News broadcast (curve 704), the movie Star Trek:TNG (curve 706), and a basketball game (curve 708). Each was a 30-minute or more segment of the closed captioning data. As shown in FIG. 7, regardless of the source content, the percentage of each word size in the content falls within a standard deviation of approximately +/−5%.

Figure 8:
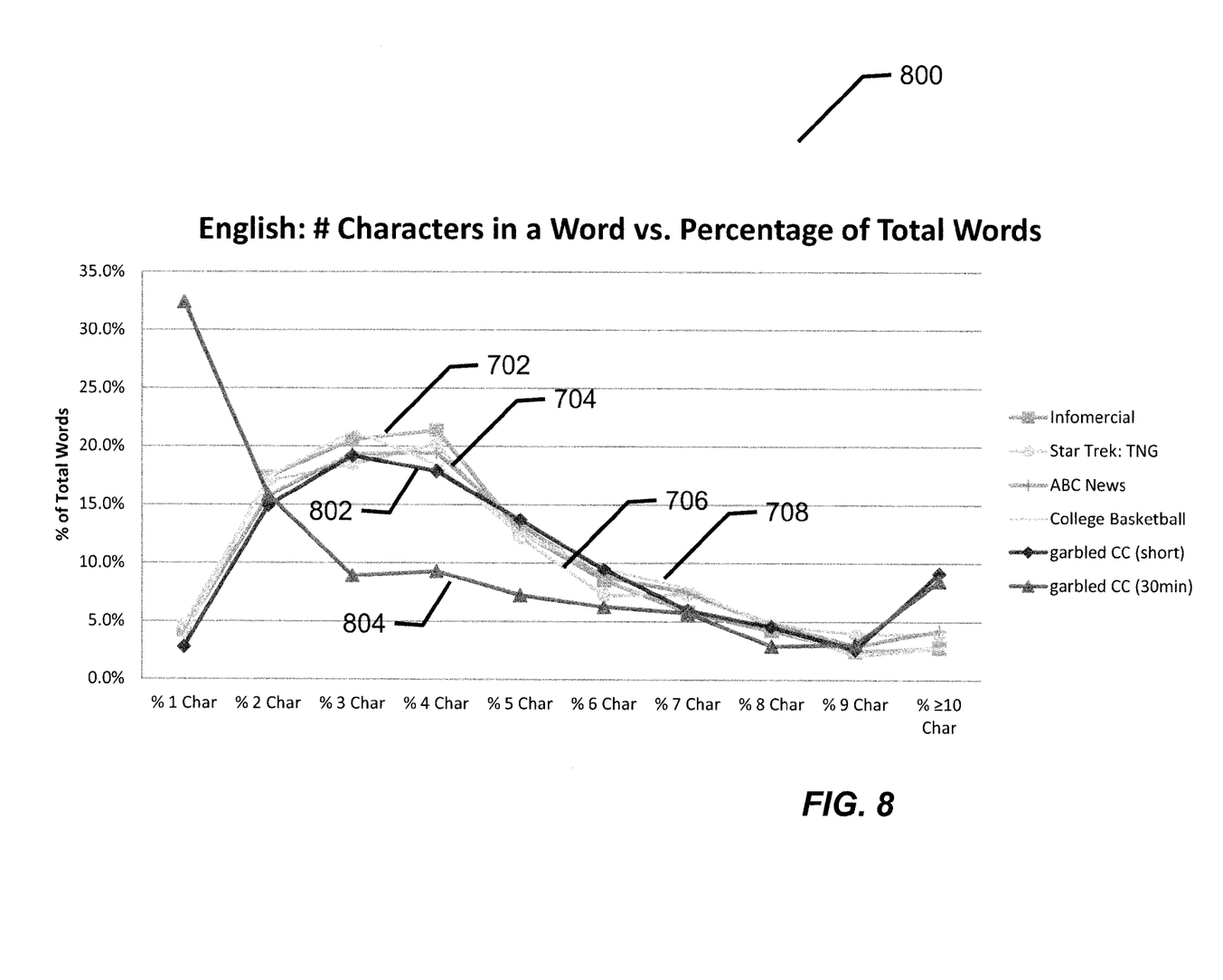
FIG. 8 illustrates a graph of the percentage of words having a given word length as a percentage of the total number of words in the content as shown in FIG. 7 and compared to two garbled closed captioning sources.

FIG. 8 illustrates a graph 800 of the percentage of words having a given word length as a percentage of the total number of words in the content as shown in FIG. 7 and compared to two garbled closed captioning sources (different from the FIG. 7 sources), one having a shorter (5 minute) duration (curve 802) and the other having a longer (30 minute) duration (curve 804). The short garbled content closed captioning was derived by observing a 30 minute interval of on-air closed captioning, in which only a 5-minute portion was garbled. The longer garbled content was generated by playing out 24 frames per second closed captioning data at a 60 frames per second rate. From the data shown in FIG. 8, two choices for the predetermined threshold are shown by a sharp increase in the percentages in the garbled content versus the clean content. The two are the percentage of words having one character and the percentage of words having 10 or more characters. Because closed captioning data often begins with a lone symbol, such as a dash ("-"), the one-character word length is believed to be a less effective trigger than the ten or more character word length.

Figure 9:
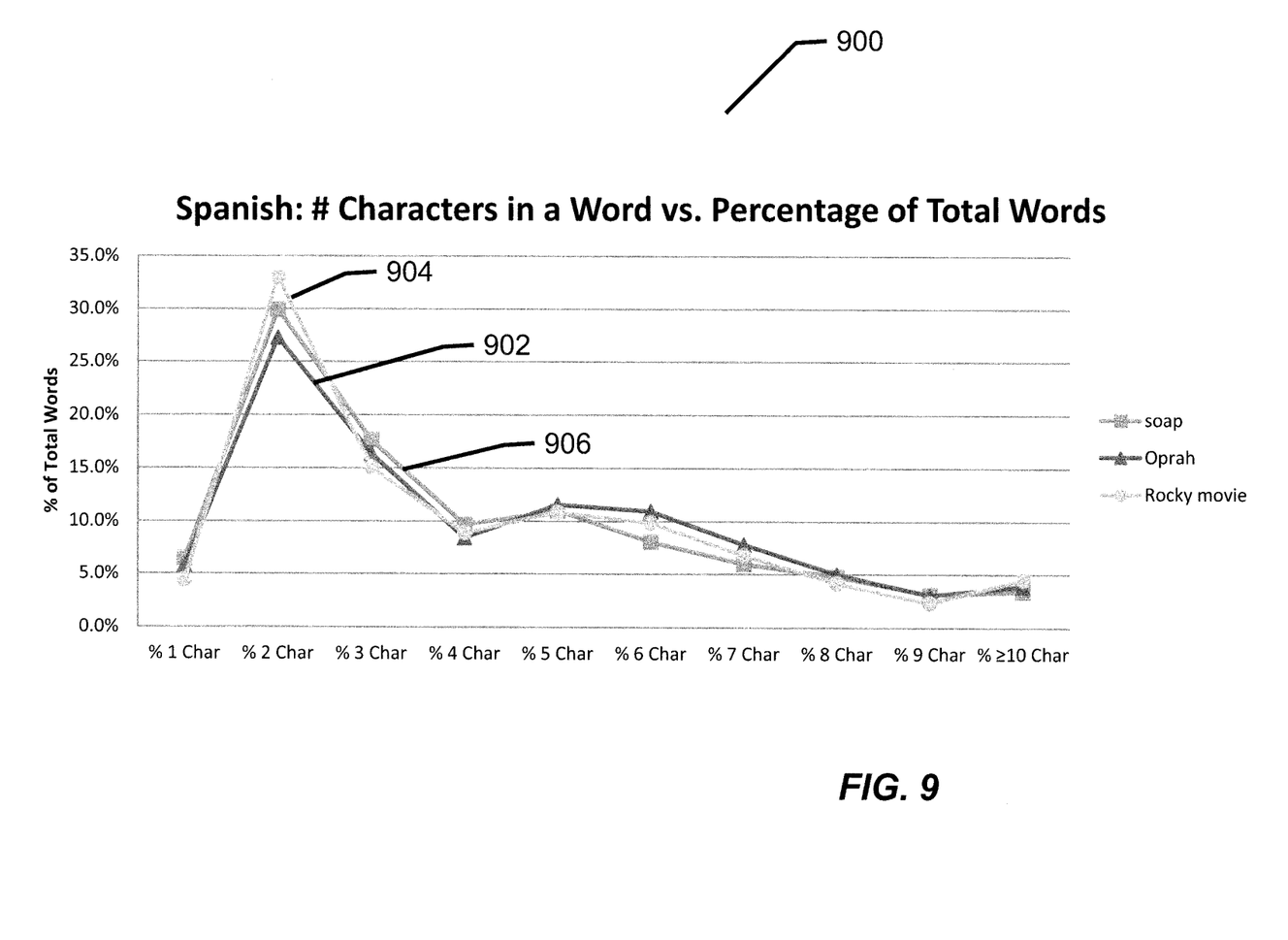
FIG. 9 is a graph illustrating the percentage of words having various character lengths in the total content for Spanish.

Embodiments of the present invention can be used in different languages. FIG. 9, for example, is a graph illustrating the percentage of words having various character lengths in the total content for Spanish as shown, for example in curves 902 (Oprah), 904 (the movie Rocky), and 906 (a soap opera). A predetermined percentage threshold for comparison can be determined as described above by comparing the curves for known garbled content to known clean content as explained above to determine the appropriate word length and percentage threshold at which to provide an alert.

Figure 10:
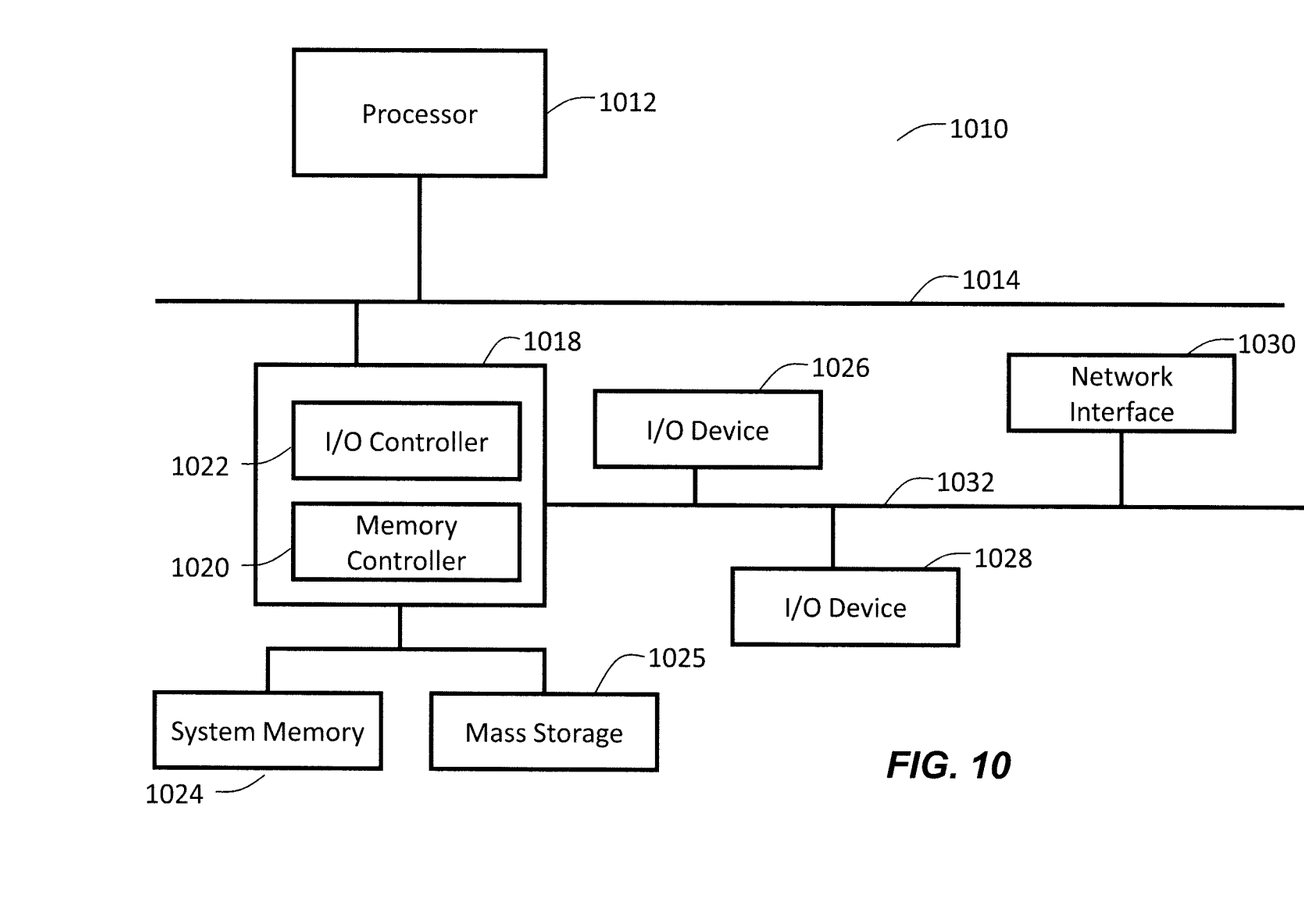
FIG. 10 is a block diagram of an example processor system that may be used to implement the apparatus and methods described herein according to an embodiment of the present invention.

FIG. 10 is a block diagram of an example processor system 1010 that may be used to implement the apparatus and methods described herein. For example, garbled closed captioning detector 310 and components 400 for detecting garbled closed captioning may be implemented on processor system 1010. As shown in FIG. 10, processor system 1010 includes a processor 1012 that is coupled to an interconnection bus 1014. Processor 1012 may be any suitable processor, processing unit or microprocessor. Although not shown in FIG. 10, system 1010 may be a multi-processor system and, thus, may include one or more additional processors that are identical or similar to processor 1012 and that are communicatively coupled to interconnection bus 1014.

Processor 1012 of FIG. 10 is coupled to a chipset 1018, which includes a memory controller 1020 and an input/output (I/O) controller 1022. As is well known, a chipset typically provides I/O and memory management functions as well as a plurality of general purpose and/or special purpose registers, timers, etc. that are accessible or used by one or more processors coupled to the chipset 1018. The memory controller 1020 performs functions that enable the processor 1012 (or processors if there are multiple processors) to access a system memory 1024 and a mass storage memory 1025.

System memory 1024 may include any desired type of volatile and/or non-volatile memory such as, for example, static random access memory (SRAM), dynamic random access memory (DRAM), flash memory, read-only memory (ROM), etc. The mass storage memory 1025 may include any desired type of mass storage device including hard disk drives, optical drives, tape storage devices, etc.

The I/O controller 1022 performs functions that enable the processor 1012 to communicate with peripheral input/output (I/O) devices 1026 and 1028 and a network interface 1030 via an I/O bus 1032. I/O devices 1026 and 1028 may be any desired type of I/O device such as, for example, a keyboard, a video display or monitor, a mouse, etc. Network interface 1030 may be, for example, an Ethernet device, an asynchronous transfer mode (ATM) device, an 802.11 device, a DSL modem, a cable modem, a cellular modem, etc. that enables processor system 1010 to communicate with another processor system.

While memory controller 1020 and I/O controller 1022 are depicted in FIG. 10 as separate blocks within chipset 1018, the functions performed by these blocks may be integrated within a single semiconductor circuit or may be implemented using two or more separate integrated circuits.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system to detect garbled closed captioning data, comprising:
   a receiver to receive an encoded video data stream containing closed captioning data;
   a decoder to decode the encoded video data stream, and to reorder frames in the encoded video stream into display order;
   a closed captioning data detector to detect closed captioning data in the decoded, reordered video data stream;
   a data extractor to extract individual data elements from the detected closed captioning data;
   a data counter to count a total number of data elements in the closed captioning data as a total data element count, and to count a total number of data elements in the closed captioning data having a particular characteristic as a total data element characteristic count;
   a memory in which to store the total data element count and the data element characteristic count in the memory;
   a garbled closed captioning data detector to determine a metric as a function of the total data element count and the total data element characteristic count; and
   an alert generator that generates an alert in accordance with the determined metric.

2. The system recited in claim 1, wherein the memory stores a predetermined threshold, and wherein the garbled close captioning detector includes a percentage threshold detector that determines the metric as a percentage of data elements having the particular data element characteristic in the closed captioning data as the ratio of the total data element characteristic count to the total data element count, and the alert generator generates the alert when the metric exceeds the predetermined threshold.

3. The system recited in claim 1, wherein the total data element count and total data element characteristic count are determined over an interval, the metric is determined over the interval, and the alert is provided, if at all, at the end of the interval.

4. The system recited in claim 1, wherein the particular characteristic is one of a word length that is greater or equal to 10 characters and a range of word lengths such that the lower bound of the range of word lengths is at least 10 characters.

5. The system recited in claim 1, wherein the data counter uses a data delimiter to identify unique data elements within the closed captioning data for determining total data element count and total data element characteristic count.

6. The system recited in claim 1, wherein the closed captioning data detector is capable of detecting closed captioning data in MPEG-2 format or MPEG-4 format.

7. The system recited in claim 2, wherein the predetermined threshold is in the range from 5 percent to 10 percent.

8. The system recited in claim 2, wherein the predetermined threshold is 5 percent and the particular characteristic is a one of a word length having at least 10 characters and a range of word lengths wherein the lower bound of the range of word lengths is at least 10 characters.

9. The system recited in claim 2, wherein the predetermined threshold varies depending upon at least one of time of day, day of week, and time of year.

10. A method to detect garbled closed captioning data, comprising:
    receiving an encoded video data stream containing closed captioning data;
    decoding the encoded video data stream, and to reorder frames in the encoded video stream into display order
    detecting closed captioning data in the decoded, reordered video data stream;
    extracting individual data elements from the closed captioning data;
    storing a count of the total number of data elements in the closed captioning data in a memory as a total data element count;
    storing a count of the total number of data elements in the closed captioning data having a particular characteristic in the memory as a total data element characteristic count;
    determining a metric as a function of the total data element count and the total data element characteristic count; and
    providing an alert in accordance with the determined metric.

11. The method recited in claim 10, further comprising:
    storing a predetermined threshold in the memory;
    determining the metric as a percentage of data elements having the particular data element characteristic in the closed captioning data as the ratio of the total data element count to the total number data element characteristic count; and
    providing the alert when the metric exceeds the predetermined threshold.

12. The system recited in claim 11, further comprising:
    determining the total number of data elements and total number of data elements having the particular data element characteristic over an interval;
    determining the determined percentage over the interval; and
    providing or not providing the alert at the end of the interval.

13. The method recited in claim 10, wherein the particular characteristic is one of a word length that is at least 10 characters and a range of word lengths, wherein the lower bound of the range of word lengths is at least 10 characters.

14. The method recited in claim 10, further comprising using a space character as the delimiter.

15. The method recited in claim 10, further comprising detecting closed captioning data in MPEG-2 format or MPEG-4 format.

16. The method recited in claim 11, wherein the predetermined threshold is in the range from 5 percent to 10 percent.

17. The method recited in claim 11, wherein the predetermined percentage is 5 percent and the particular characteristic is a one of a word length having at least 10 characters and a range of word lengths wherein the lower bound of the range of word lengths is at least 10 characters.

18. The method recited in claim 11, wherein the predetermined percentage varies depending upon at least one of time of day, day of week, and time of year.

\* \* \* \* \*